United States Patent Office 2,703,605
Patented Mar. 8, 1955

2,703,605

RIM ANCHORING ATTACHMENT FOR TIRE REMOVING TOOLS

Anthony B. Manupello, Central Park, N. J.

Application February 18, 1953, Serial No. 337,541

1 Claim. (Cl. 157—1.17)

This invention relates to new and useful improvements in tire removing tools and the primary object of the present invention is to provide an attachment for tire engaging and depressing tools that will retain such tools pivotally engaged with a tire rim.

Another important object of the present invention is to provide a holder and retainer attachment for tire removing tools including a holding arm and a novel and improved longitudinally adjustable hook element carried by the arm for engaging the beading of a tire rim.

A further object of the present invention is to provide a holding and retaining attachment for tire removing tools, including a holding arm pending a series of longitudinally spaced notches that will selectively receive an adjusting pin carried by the hook element as well as a spring urged retaining pin fixed to the hook element whereby the hook element will be longitudinally adjustable on the holding arm.

A still further aim of the present invention is to provide an attachment for tire removing tools that is extremely simple and practical in construction, strong and reliable in use, small and compact in structure, efficient and durable in operation, inexpensive to manufacture, and otherwise adapted to the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary front elevational view of Figure 2;

Figure 4 is a fragmentary rear elevational view of Figure 2.

Figure 1:
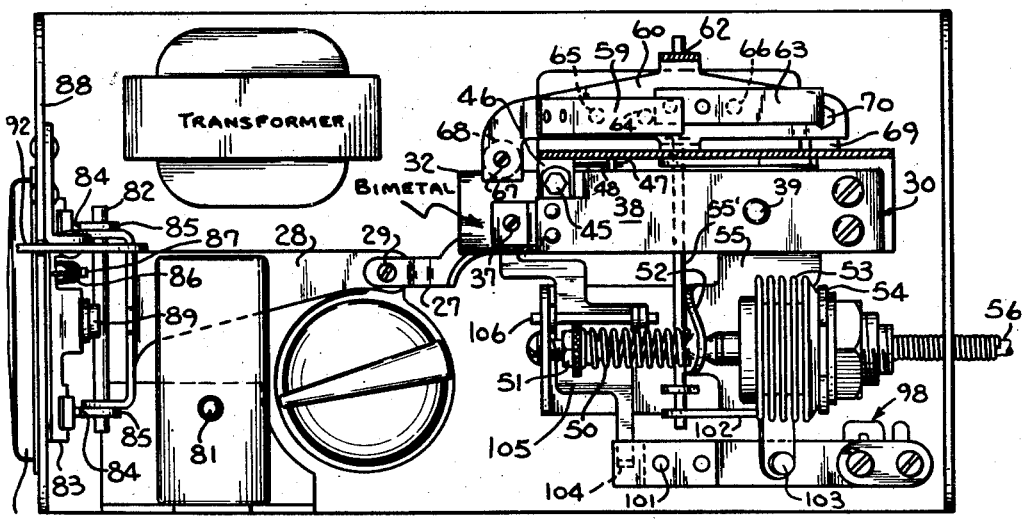
Figure 1 is a fragmentary vertical sectional view of a vehicle wheel and showing the present invention attached thereto and pivotally connected to a tire removing tool.

Referring now to the drawings in detail, wherein for the purposes of illustration, there is disclosed a preferred embodiment of the present invention, the numeral 10 represents a portion of a well known hydraulic jack or lever bar having a claw portion 12 that will rock against the side wall of a tire T to force the same from the flange F of a rim R.

The present invention does not attempt to claim the above structure which is more specifically described in my U. S. Patent Number 2,606,602, but is merely an attachment therefor that will hold and retain the lever bar 10 relative to the rim R so that the lever bar can be moved to a tire engaging and depressing position.

To accomplish the desired results, there is provided a clamp ring 14 suitably secured to the lever bar 10, adjacent the claw 12, and having a radially projecting curved rocker arm 16 suitably fixed thereto that will engage the flange F of the rim R when the device is in use. The shorter apertured end 18 of an L-shaped holding arm or bar 20 is pivotally attached to rocker arm 16 by pivot fastener 22. One longitudinal edge 24 of the holding arm 20 is provided with a series of longitudinally spaced notches 26, whereas the opposite longitudinal edge 28 of the arm 20 is void of notches.

The bifurcated shank portion 30 of a rim engaging hook element 32 slidably receives the arm 20 and includes an inner wall 34, inclined relative to the hook element 32, that engages the edge 28. A transverse adjusting pin 36 is suitably fixed to and between the furcations of the bifurcated shank portion 30 and will enter a selected one of the notches 26.

One end of a leaf spring or a resilient arm 38 is suitably removably secured or fixed to the shank portion 30 of the hook element 32. The arm 38 curves downwardly and inwardly toward the hook element 32 and its free end is fixed to a retaining pin 40 that parallels pin 36 and which is yieldingly urged by spring arm 38 into one of the notches 26.

It is preferred that the inner parallel faces of the bifurcated shank portion 30 be provided with grooves 42 that accommodate the reduced upper end of the spring arm 38, after which the upper edge of the spring arm 38 is bent, as at 44, to crimp the spring arm to the hook element.

In practical use of the present invention, the rocker arm 16 is engaged upon the flange F and the holding arm 20 is extended downwardly relatively close to the inner periphery of the rim R. Pin 40 is pulled away from the arm 20 and hook element 32 is rocked upwardly on pin 36 afterwards the pin 36 is disengaged from the notch 26. The hook element 32 is then moved longitudinally upon the arm 20 so that the hook element 32 will engage the beading B of the rim R opposite the flange F. Then pin 40 is released so that it will enter a notch 26 to retain the hook element 32 longitudinally adjustable upon the arm 20.

After the holding and retaining arm 20 has been engaged with the rim R as shown in Figure 1, it is merely necessary to swing the lever bar 10 to a substantially vertical position in order that the claw 12 will depress the tire casing to the dotted line position shown in Figure 1 to remove the tire from the rim. As previously stated, the tool 10 may comprise a hydraulic jack in which instance the piston rod (not shown) to which the claw 12 is secured is moved longitudinally in order to increase the depressing action upon the tire T.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A holding and retaining attachment for hydraulic tire removing jacks, said attachment comprising a holding arm having a longitudinal edge provided with a series of longitudinally spaced notches, a jack engaging bracket pivotally secured to one end of said arm, a rim-flange engaging hook element having a bifurcated shank portion slidably receiving the arm, said hook element being in opposing relationship with said bracket, an adjusting pin secured to and between the furcations of said bifurcated shank portion for positioning in a selective one of said notches; said shank portion having a wall engaging the edge of the arm opposite said notched edge, a leaf spring having one end fixed to said shank portion, and a retaining pin secured to said spring and yieldingly urged by the latter into a selected one of the notches to retain the hook element longitudinally adjusted on the arm.

References Cited in the file of this patent

UNITED STATES PATENTS

| | | |
|---|---|---|
| 198,754 | Rockwell et al. | Jan. 1, 1878 |
| 953,531 | Kester | Mar. 29, 1910 |
| 1,116,468 | Nelson | Nov. 10, 1914 |
| 1,219,469 | Lauer et al. | Mar. 20, 1917 |
| 2,581,086 | Edenfield et al. | Jan. 1, 1952 |
| 2,621,715 | Lien et al. | Dec. 16, 1952 |

March 8, 1955   R. W. JOHNSON ET AL   2,703,606
FUEL AND IGNITER CONTROL APPARATUS FOR OIL BURNERS
Filed July 18, 1951   5 Sheets-Sheet 1

INVENTORS
ROY W. JOHNSON
WILLIAM A. BIERMANN
STANLEY E. BURGHDUFF
BY John W. Michael
ATTORNEY March 8, 1955  R. W. JOHNSON ET AL  2,703,606
FUEL AND IGNITER CONTROL APPARATUS FOR OIL BURNERS
Filed July 18, 1951  5 Sheets-Sheet 2
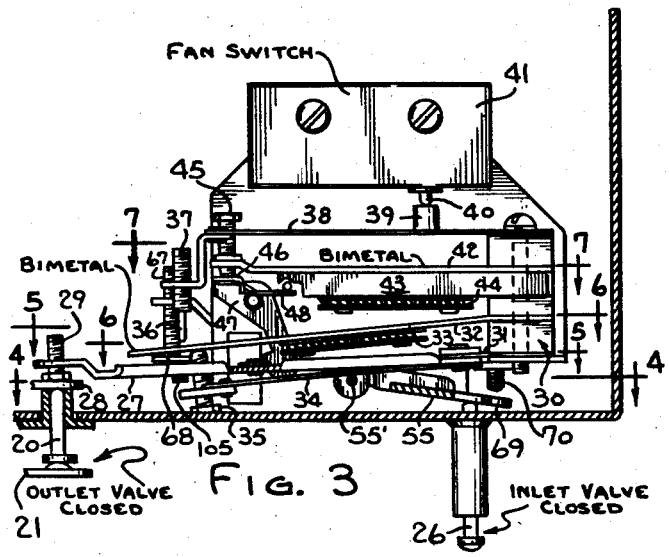
FIG. 3
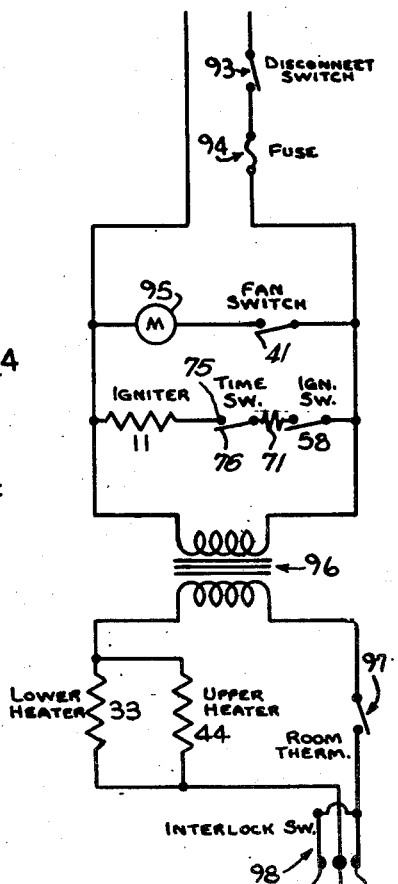
FIG. 19
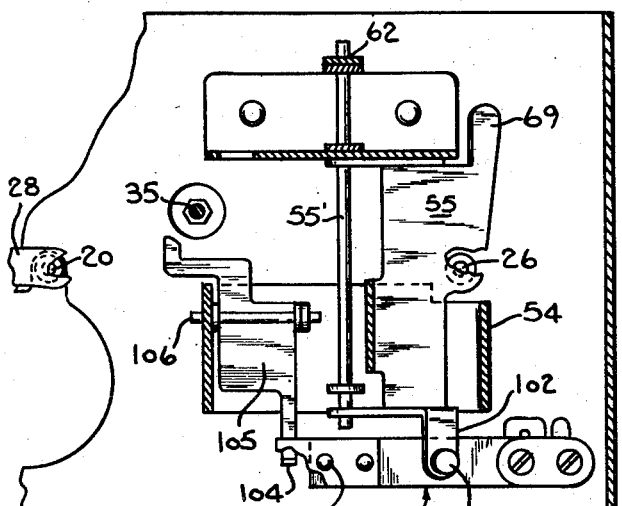
FIG. 4
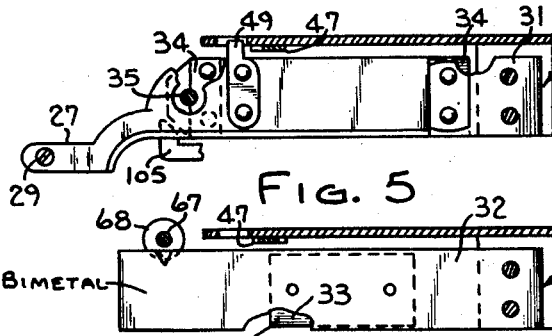
FIG. 5
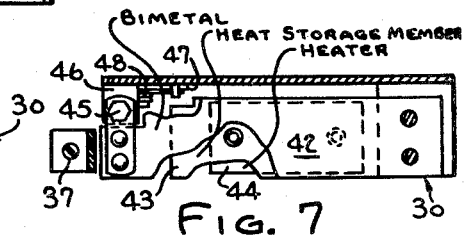
FIG. 7
FIG. 6
INVENTORS
ROY W. JOHNSON
WILLIAM A. BIERMANN
STANLEY E. BURGHDUFF
BY John W. Michael
ATTORNEY

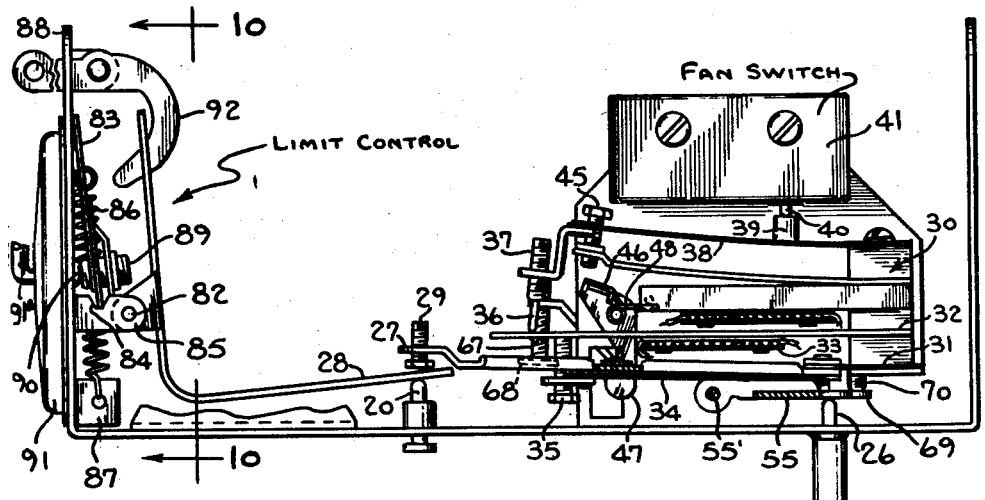
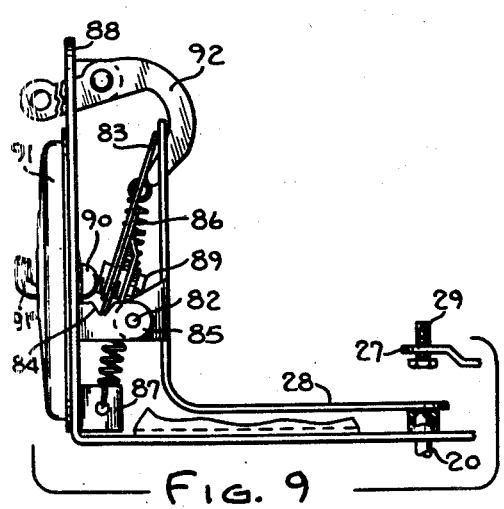
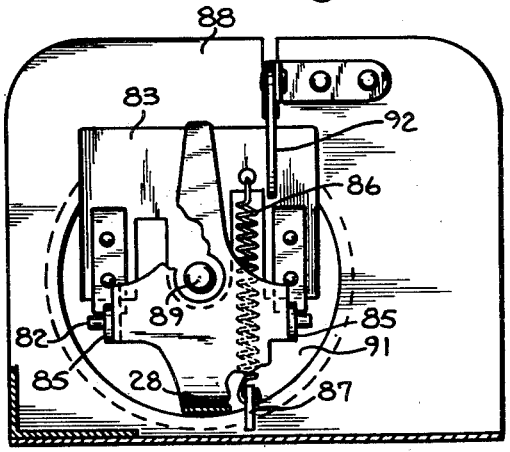
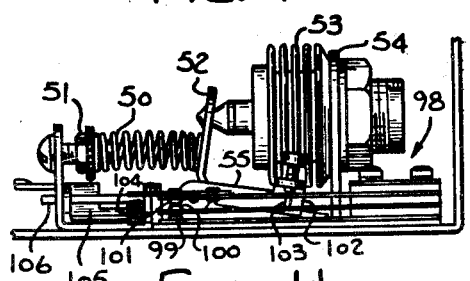
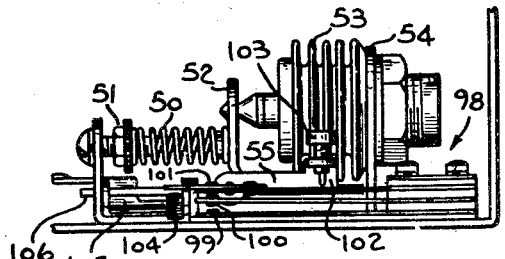

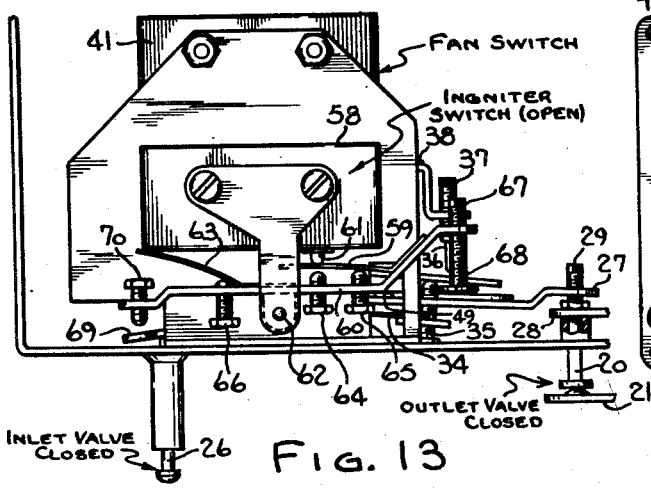

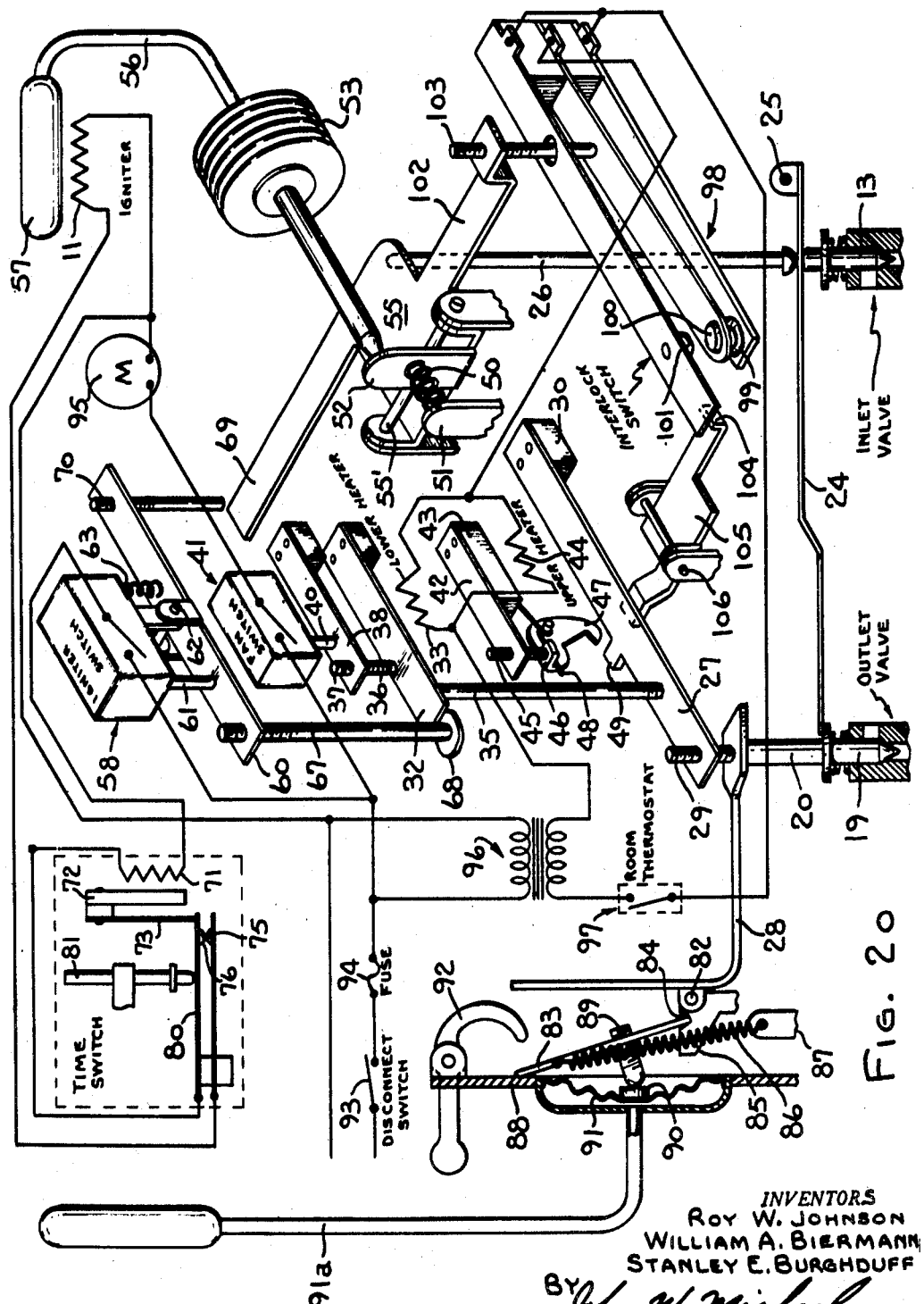

United States Patent Office 2,703,606
Patented Mar. 8, 1955

2,703,606

FUEL AND IGNITER CONTROL APPARATUS FOR OIL BURNERS

Roy W. Johnson, William A. Biermann, and Stanley E. Burghduff, Milwaukee, Wis., assignors to AP Controls Corporation, Milwaukee, Wis., a corporation of Wisconsin Application July 18, 1951, Serial No. 237,332

16 Claims. (Cl. 158—28)

This invention relates to vaporizing oil burners and particularly to provision of a reliable electric ignition system for such burners. The scope of this invention encompasses the oil flow controls used in operation of the burner.

An object of this invention is to provide reliable control mechanism for an electrically ignited vaporizing oil burner.

Another object is to prevent flooding the burner under any condition.

Another object is to provide controls of the type described in which the igniter is de-energized if ignition fails to take place in a given time.

A further object is to provide controls of the type described in which flow to the burner is prevented until the igniter has reached ignition temperature.

Another object is to provide a fuel control which eliminates the pilot fire condition and avoids the soot problems encountered at pilot or low fire.

Still another object is to provide a fuel flow control which varies the operating characteristics in accordance with the heating load to thereby attain steady, comfortable heat.

Figure 2:
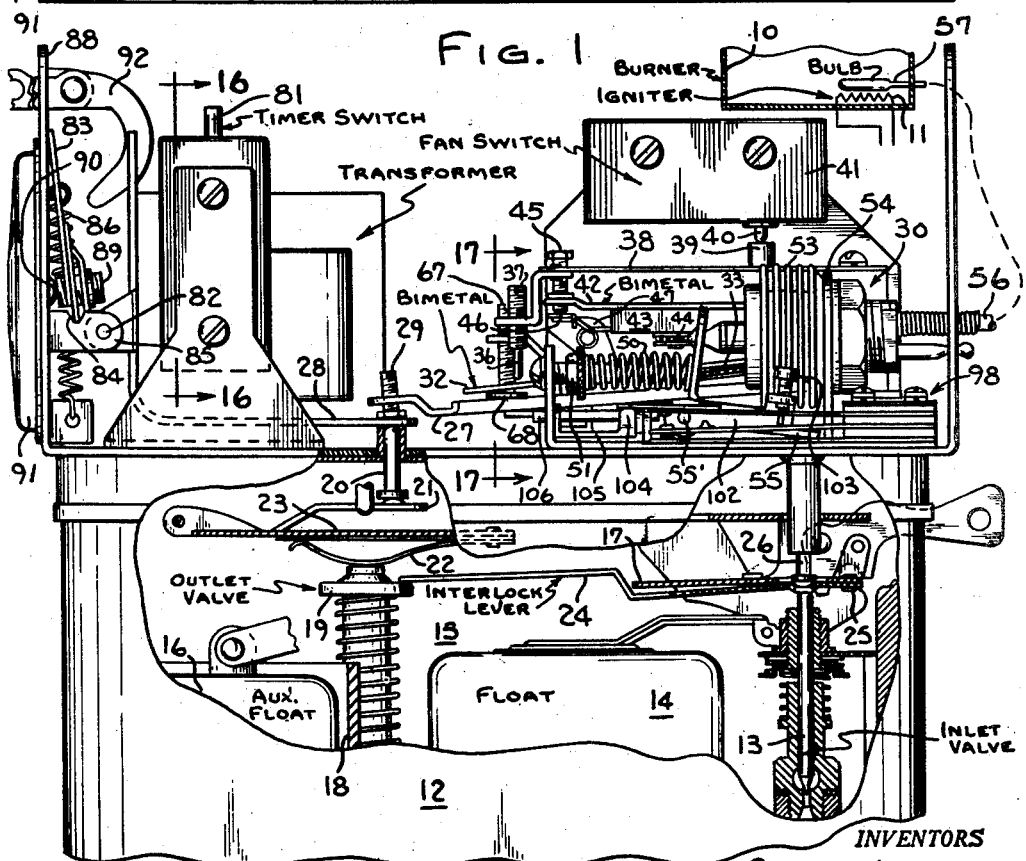
Figure 2 is a side view, partly in section, and partly in elevation, of the holding and retaining attachment.

Other objects and advantages will be pointed out in, or be apparent from, the specification and claims, as will obvious modifications of the single embodiment shown in the drawings, in which:

Fig. 1 is a top view of the control mechanism with the fan and igniter switches removed to better show the underlying levers;

Fig. 2 is a front elevation of the control mounted on a constant level oil valve and includes a diagrammatic showing of the burner, igniter and control bulb;

Fig. 3 is a fragmentary front elevation corresponding to Fig. 2 with the bellows and interlock switch removed to better illustrate the bimetals and levers;

Fig. 4 is a section taken on line 4—4 of Fig. 3 to illustrate the leverage for operating the interlock switch and the igniter switch;

Fig. 5 is taken as indicated by line 5—5 on Fig. 3 to show the outlet valve operating lever;

Fig. 6 is taken on line 6—6 in Fig. 3 to illustrate the lower bimetal which operates the outlet valve lever;

Fig. 7 is taken on line 7—7 in Fig. 3 to show the upper bimetal and its associated heater and heat storage member;

Fig. 8 is similar to Fig. 3 but includes the limit control and shows the parts in the high fire position with the intermediate fire latching mechanism in position to operate;

Fig. 9 shows the limit control in its tripped position;

Fig. 10 is an end view of Fig. 9 taken on line 10—10 of Fig. 8;

Fig. 11 shows the interlock switches stacked as the lower bimetal moves toward the high fire position before the bellows has expanded;

Fig. 12 is similar to Fig. 11 but shows the effect of bellows expansion on the interlock switches;

Fig. 13 is a rear elevation of the control in its "off" position;

Fig. 14 is similar to Fig. 13 and shows the positions of the various levers, etc. when the igniter switch is closed and before fuel flow has taken place;

Fig. 15 is similar to Fig. 13 and shows the intermediate or medium fire position of the mechanism:

Fig. 16 is an elevation of the timing switch taken as indicated by line 16—16 on Fig. 2;

Fig. 17 is a fragmentary view of Fig. 2 taken as indicated by line 17—17;

Fig. 18 is similar to Fig. 17 but shows the parts in positions corresponding to Fig. 11;

Fig. 19 is the wiring diagram for the control; and

Fig. 20 is a schematic isometric view of the present control with the upper and lower bimetals reversed to facilitate the showing.

The control mechanism is adapted to control fuel oil flow to burner 10 and regulate energization of igniter 11 positioned in the bottom of the burner. The igniter may be of any satisfactory type but is preferably a sheathed resistance element which will resist scaling and deterioration. The control apparatus is adapted to be mounted on top of a constant level oil control of the type shown in Patent No. 2,547,995 wherein an inlet valve 13 is regulated by float 14 to maintain a constant level in chamber 15. The oil valve is also provided with an auxiliary float 16 operable to release striker plate 17 when the oil level in chamber 15 overflows dam 18 to float the auxiliary float. Further details of this apparatus may be seen in the above-mentioned patent. The oil valve is also provided with an outlet valve 19 which is adapted for automatic operation through actuation of pin 20 projecting upwardly through the top of the casing and resting on lever 21. Since the outlet valve is biased to the open position, pin 20 tends to move upwardly as the valve acts against the cushioning spring 22 on the underside of lever 23. A downward force applied to the pin acts through levers 21 and 23 and spring 22 to close the valve. As thus far described the mechanism is shown in greater detail in said Patent No. 2,547,995.

In the present oil control valve an interlock lever 24 is loosely connected to the underside of the striker plate at 25 to permit the lever to move with respect to the striker plate. The interlock lever rests on the top of the inlet valve and the valve operating plunger 26 depending from the control apparatus to be described hereinafter passes through a cooperating aperture in the striking plate to rest on the interlock lever to actuate the inlet valve and the lever. When plunger 26 acts to close inlet valve 13 interlock lever 24 closes valve 19. Thus any time the control apparatus acts to close inlet valve 13, outlet valve 19 will be closed even though the control apparatus may be in a position otherwise permitting the valve to open.

Ignoring for the moment the fact that the outlet valve cannot open when the inlet valve is closed, movement of the outlet valve is regulated by operating lever 27 which acts on the top of pin 20 through the medium of a normally rockable trip lever 28 (which will be described more fully hereinafter) and an adjusting screw 29. The operating lever is connected to mounting board 30 by means of a short leaf spring 31 which urges the lever upwardly. Bimetal 32 is also mounted on block 30 and is adapted to warp upwardly when heated by heater 33. When the bimetal is in its lowermost position as shown in Figs. 2, 3 and 13, it tends to overtravel lever 27 and for this reason leaf spring 34 is connected to the underside of lever 27 and bears on the underside of bimetal 32 through the medium of adjusting nut 35. Therefore, when bimetal 32 tends to overtravel lever 27 after the lever has fully closed the outlet valve, the bimetal only moves leaf spring 34 against its bias away from the underside of lever 27. When the bimetal again warps, leaf spring 34 first moves up into contact with the underside of lever 27 before lever 27 starts to follow bimetal 32 under influence of the inherent resiliency of lever mounting spring 31.

As bimetal 32 warps upwardly its upper surface contacts bearing pin 36 depending from adjustable screw 37 mounted in the free end of leaf spring 38 to raise the leaf spring and move pad 39 upwardly against switch element 40 depending from fan switch 41 to close the fan switch. The exact sequence of the fan switch closure will be described more fully hereinafter. It will be appreciated that when bimetal 32 cools and returns to the position shown in Fig. 3, leaf spring 38 follows and opens the fan switch.

Before considering other operational aspects of the control apparatus it should be pointed out that a second or upper bimetal 42 is mounted on board 30 in heat conductive relationship to brass bar or heat storage member 43 heated by heater 44. When the bimetal warps upwardly adjustable screw 45 is raised from pad 46 projecting laterally from crank-like latch 47 to permit spring 48, coiled about the axis of latch 47, to rotate the latch from its inoperative position (Fig. 3) to its operative or latching position (Figs. 8 and 15) where it lies in the path of ear 49 projecting laterally from valve operating lever 27 as lever 27 moves in the valve closing direction. The brass bar or heat storage member 43 retards warping of the upper bimetal 42, but assuming that the upper bimetal has had sufficient time to warp and allow latch 47 to move into its latching position, lever 27 will be prevented from closing the outlet valve completely when heater 33 for lower bimetal 32 is de-energized. Thus ear 49 projecting from lever 27 engages the latch at an intermediate or medium fire position. After heat storage member 43 has dissipated sufficient heat, bimetal 42 will cool and move latch 47 to its inoperative position, thus disengaging lever 27 and permitting it to snap the outlet valve shut. It is to be noted that when lever 27 is latched at the medium fire position the provision of the leaf spring 34 allowing overtravel of lower bimetal 32 prevents undue strain on or deformation of lower bimetal 32.

As may be seen in Figs. 1, 2, 4, 11, 12 and 20, spring 50 is compressed between adjustable seat 51 and upwardly projecting arm 52 which also serves as a bearing point for bellows 53 mounted in bracket 54 and expandable against the force of spring 50. Arm 52 is part of crank or plate 55 pivotally mounted on shaft 55'. The generally horizontal portion of plate 55 overlies the upper end of inlet valve operating plunger 26 and acts downwardly on the top of the plunger under influence of compressed spring 50. It will be appreciated, therefore, that inlet valve 13 in the oil control valve is held shut by plate 55. Since plunger 26 also acts to hold outlet valve 19 closed through the medium of interlock lever 24, it will be appreciated that energization of the lower bimetal as described above will not operate to open the outlet valve until the plunger is raised even though the operating lever moves to a position permitting the valve to open. In order to raise plunger 26, plate 55 must be rotated about its pivot against the force of spring 50 by expanding bellows 53. Bellows 53 is connected by a capillary tube 56 to a bulb 57 positioned in intimate contact with the igniter so as to respond to the temperature of the igniter as well as being responsive to the heat of the fire in the burner. When the igniter has been energized (by means to be described hereinafter), the charge in the bulb will cause bellows 53 to partially expand when the igniter has reached incandescence (or the temperature required for ignition) to rock plate 55 about its pivot and raise the plate from plunger 26 thereby permitting inlet valve 13 and outlet valve 19 to open, thus allowing oil to flow to the burner where it is ignited.

Referring now to Fig. 13, it will be noted that igniter switch 58 is operated by leaf spring 59 secured to lever 60 and bearing against depending actuator 61. Lever 60 is rockably mounted on pivot 62 and is urged in a counter-clockwise direction by leaf spring 63 bearing against the underside of the igniter switch housing. The action of switch actuating spring 59 may be varied by means of set screws 64, 65 and the action of bias spring 63 may be adjusted by means of screw 66. The right-hand end of lever 60 is provided with adjustable screw 67 having a large head 68 which projects under the edge of lower bimetal 32. As the lower bimetal warps upwardly, bias spring 63 rocks lever 60 counter-clockwise to maintain head 68 in contact with the underside of the bimetal and thus forces actuating spring 59 against switch actuator 61 to close the igniter circuit. Therefore when the bimetal moves toward the high fire position the igniter switch is closed to energize the igniter (see Fig. 14).

As pointed out above, energization of the igniter serves to heat bulb 57 and expand bellows 53 to relieve pressure on plunger 26 and allow oil to flow to the burner. When ignition takes place the heat of the fire in the burner raises the temperature of the bulb and causes the bellows to expand still further, thus rocking plate 55 further. As will be seen in Fig. 4, crank 55 is provided with ear 69 which underlies the left-hand end (Figs. 13 through 15) of lever 60. As the bellows expands further, this ear is brought into contact with adjustable screw 70 on the left-hand end of lever 60 and rocks the lever clockwise against the bias of spring 63 to move actuating spring 59 slightly downwardly and open the igniter switch, as shown in Fig. 15. It will be appreciated that the igniter switch, as well as the fan switch, are of the snap acting variety requiring very little movement of the actuating pin in order to make or break the circuit.

It will readily be appreciated that it would be undesirable to continue to energize the igniter in the event that ignition fails to take place for any reason such as the oil supply tank being empty. In order to prevent such continuous energization of the igniter, a time switch is connected in series with the igniter. This mechanism is provided with heater 71 (Fig. 16) connected in series with the igniter and mounted adjacent brass bar 72 which is heated by the heater and radiates heat to trip-out bimetal 73 mounted on the right-hand end (Fig. 16) of lever 74 to hold contacts 75, 76 in engagement under influence of spring 77 compressed between the lever and the switch housing. The bias of spring 77 is very light. The left-hand end of lever 74 is provided with a compensating bimetal 78 which bears against an adjustable reference point 79 threaded in the housing and having a frusto conical section giving a variable reference point for the compensating bimetal. This latter bimetal compensates the main bimetal 73 and ambient temperature so that the time allowed for ignition to take place will remain constant in spite of ambient temperature variations. If ignition does not take place within a given period of time the brass bar 72 will be heated to the extent that the heat radiated by the bar to trip-out bimetal 73 will warp the free end toward the right to disengage switch element 76 which is then snapped upwardly by virtue of the resilient or leaf spring mounting strip 80 carrying the contact. This breaks the igniter circuit and the circuit must be reset manually by depressing rod 81 to force contact 76 against contact 75 and permit the cooled bimetal 73 to snap back over the top of mounting strip 80. Since the bias of spring 77 is slight and since the tip of compensating bimetal 78 acts on an inclined surface, the operating bimetal 73 does not drop down to a point too low for re-engagement of the apparatus. The bottom contact 75 is also carried on a resilient strip which will permit both contacts to be moved downwardly to a considerable extent, if necessary, to re-engage the trip-out bimetal 73 with the upper surface of mounting strip 80.

In order to prevent too high a temperature in the bonnet of the furnace, the present device is provided with a limit control which includes the previously mentioned normally freely rockable trip lever 28 which rides on the top of operating pin 20 between the pin and operating lever 27. This lever is in the form of a crank and is pivoted on pin 82 at the left-hand end of the control housing (Figs. 1, 2 and 8). As may be seen most clearly in Figs. 8 through 10, plate 83 is pivotally supported in notches 84 in parallel arms 85 supporting pin 82. Plate 83 is held in the notches by means of spring 86 tensioned between the plate and bracket 87 adjacent the bottom of the control housing. As may be seen by comparing Figs. 8 and 9, spring 86 acts as a toggle spring biasing plate 83 either against the end wall 88 of the control housing or against the upper end of crank or trip lever 28. The plate is provided with an adjustable pressure pad 89 which bears against the central pad 90 of diaphragm 91 connected by means of a capillary tube 91a to a bulb or other device, not shown, in the bonnet of the furnace. When the bonnet temperature exceeds the predetermined limit, diaphragm 91 throws from the position shown in Fig. 8 to the position shown in Fig. 9 forcing place 83 from its inoperative position to its operative position where it bears against the upper end of trip lever 28. This delivers a forcible blow to pin 20 which in turn acts through the leverage as previously described to close valve 19 and interrupt flow to the burner. Since the action is a toggle action, it will be appreciated that the limit control must be manually reset. For this purpose a reset arm 92 is pivotally mounted in the housing and extends through the wall of the housing for access. When the exposed end of the reset arm 92 is raised, the depending finger portion of the arm acts against plate 83 to return it to its inoperative position and free trip lever 28 for free movement about its pivot point.

The manner of wiring the present control is illustrated in Figs. 19 and 20 where the high voltage line is provided with the recommended disconnect switch 93 and associated fuse 94. These last two elements form no part of this invention but are illustrated since they are highly recommended in any control system. Fan switch 41 and fan motor 95 are connected in series across the high voltage line, and igniter 11, igniter switch 58 and the time switch are connected in series across the high voltage line. A transformer 96 steps the voltage down and room thermostat 97 is connected in series with interlock switch 98, and upper and lower bimetal heaters 44, 33, respectively, are connected in parallel and in series with the thermostat and the interlock switch.

Reference to Figs. 19 and 20 and particularly to the low voltage side of the circuit will indicate that the upper and lower bimetal heaters are energized simultaneously upon closure of the room thermostat provided that current flow can take place through the interlock switch which includes three contacts 99, 100 and 101. As seen in Figs. 2, 11, 12, 17, 18 and 20, contacts 99, 100 and 101 may also be referred to as lower, middle and upper contacts, respectively. Referring first to Fig. 2 where the so-called "off" position is indicated, the lower and middle contacts 99 and 100 are in engagement. The lower contact is stationary on the bed of the control housing. The middle contact is carried on a resilient strip which is biased upwardly out of contact with the lower contact. When the control is in its "off" position the arm 102 projecting laterally from plate 55 overlies the interlock switches, and adjustable screw 103 bears on the top surface of middle contact 100 through a cooperating aperture in the resilient mounting strip for the upper contact 101 and holds the middle contact 100 against the lower contact 99. The resilient strip for contact 101 biases the contact toward the middle contact 100 but, as shown in Figs. 2 and 17, the upper contact is held away from the middle contact by means of lug 104 projecting upwardly from lever 105 pivoted on pin 106 and underlying operating lever 27.

When operating lever 27 is in its "down" position, lever 105 is moved in a counter-clockwise direction (Figs. 17, 18 and 20) to raise the upper contact 101. However, since the lower and middle contacts are in engagement when the room thermostat demands heat, the upper and lower bimetals will be energized. Among other things, movement of operating lever 27 upwardly allows lever 105 to rotate clockwise by gravity and permit upper contact 101 to move into contact with middle contact 100 as shown in Figs. 11 and 18. As pointed out above, the heat of igniter 11 and of the fire in the burner causes bellows 53 to expand and rock plate 55 counter-clockwise. When this occurs set screw 103 on arm 102 is withdrawn from middle contact 100 and the middle contact moves away from the lower contact but remains in engagement with the upper contact as shown in Fig. 12. Upon satisfaction of the thermostatic demand for heat and return of the operating lever 27 to its lowermost position, upwardly projecting finger 104 again raises the upper contact 101 from the middle contact 100. At this point contacts 99, 100 and 101 are separated, and it will be appreciated that the upper and lower bimetal heaters cannot be energized until at least two of the switches are in contact even though the thermostat may demand heat in the interim. Since the bimetal heaters cannot be energized the igniter cannot be energized since its switch is closed by operation of the lower bimetal.

The purpose of the interlock switch, therefore, is to prevent recycling the control before the control bulb 57 has cooled off sufficiently to allow the igniter time to reach incandescence before fuel is allowed to flow to the burner. This prevents pooling the burner. If the interlock switch were not provided and the thermostat demanded heat shortly after satisfaction of the prior demand for heat, the bulb would be at such a temperature as to indicate immediately that the igniter was hot even though in fact the igniter had not reached incandescence. Therefore the control would pass oil to the burner before the igniter could handle the oil and this would flood the pot. With the provision of the interlock switch, thermostatic demand for heat is of no effect until bulb 57 has cooled sufficiently to collapse bellows 53 and lower plate 55 and set screw 103 to force the middle contact against the lower contact and re-establish the circuit.

Operation

Considering operation of the control from a cold start (Figs. 2, 3, 13, 17 and 20), when room thermostat 97 demands heat, both the upper and lower bimetal heaters 44, 33 are energized since the lower contacts 99, 100 of the interlock switch 98 are in contact. As the lower heater 33 heats bimetal 32, valve operator 27 rises in the valve opening direction and simultaneously allows lever 105 to move downwardly from the upper contact 101 of the interlock switch to allow all three contacts of the switch to become stacked (Figs. 11 and 18). As the operator continues its upward movement the igniter switch lever 60 is allowed to rotate counter-clockwise under the influence of bias spring 63 so that actuator spring 59 moves the switch plunger 61 upwardly to close the igniter switch (see Fig. 14) and energize the igniter. Further movement of the operator in the upward direction actuates leaf spring 38 to raise pad 39 against the fan switch plunger 40 to close the fan switch and start the fan motor (Fig. 8).

Even though the valve operator 27 has moved in the valve opening direction, plunger 26 operating on interlock lever 24 (Figs. 2 and 20) holds the outlet valve 19 closed to prevent oil flow to the burner until the igniter has reached the ignition temperature. When the igniter has reached incandescence, bulb 57, preferably strapped to the igniter, expands bellows 53 against the adjustable bias of spring 50 to lift plate 55 and remove screw 103 carried by arm 102 from the middle contact 100 of the interlock switch (Fig. 12) allowing the upper two contacts to move away from the lower contact while maintaining a current path through the bimetal heaters. Plate 55 is also lifted from the top of plunger 26 to relieve pressure on both the inlet and the outlet valves. Fuel now flows to the burner where it is ignited by the incandescent igniter. The heat of the burning fuel raises the temperature of bulb 57 further, causing bellows 53 to expand further and lift plate 55 until arm 69 rotates the igniter switch lever 60 clockwise to the position shown in Fig. 15 (the valve operator in this figure is shown in its intermediate position described hereinafter). This movement allows the switch plunger 61 to move downwardly and open the igniter switch.

As will be explained more fully hereinafter, upper bimetal 42 may or may not be warped sufficiently to allow latch 47 to move into its operative position where it engages the valve operator as it returns toward the closed position. Assuming for the moment that the latch has not moved into its operative position by the time the room thermostat is satisfied, the bimetal heaters are simultaneously deenergized and downward movement of lower bimetal 32 moves valve operator 27 in the valve closing direction to stop fuel flow to the burner. Simultaneously upper contact 101 of interlock switch 98 is raised out of contact with middle contact 100 which is already out of contact with the lower contact 99. This completely opens the interlock switch and prevents energization of the bimetal heaters in the event that room thermostat 97 demands heat before bulb 57 has cooled sufficiently to effectively control the fuel flow to the burner. When bulb 57 cools below the ignition temperature of the igniter, bellows 53 will collapse sufficiently for plate 55, arm 102 and screw 103 to move middle contact 100 of the interlock switch into engagement with lower contact 99 to close the circuit through the heaters and permit energization of the heaters in the event that room thermostat 97 is calling for heat. Upon such recycling bulb 57 must be reheated sufficiently to raise plate 55 from plunger 26. Therefore, no fuel can flow to the burner until the igniter has reached its ignition temperature. If the interlock switch were not provided and the room thermostat called for heat before bulb 57 had cooled off sufficiently, fuel flow to the burner could take place immediately and flood the pot.

As mentioned above, latch 47 may engage valve operator 27 to prevent complete closure of the outlet valve when the thermostat is satisfied. This condition obtains when the duration of the thermostatic demand for heat has been long enough or the frequency of thermostatic demand for heat has been frequent enough for heater 44 to heat brass bar 43 and upper bimetal 42 sufficiently to warp the bimetal to the position allowing latch 47 to move into its operative position for engagement with the valve operator, as shown in Fig. 8. Under these conditions, when the thermostat is satisfied and the lower bimetal cools the lower bimetal will move the valve operator downwardly only until the operator is engaged by the latch as seen in Fig. 15. In this event the fire in the burner will be maintained at an intermediate level until upper bimetal 42 has cooled sufficiently to move latch 47 to its inoperative position or until the thermostat again demands heat. Since the brass bar has considerable mass, it has heat storage qualities insuring that bimetal 42 will cool slowly. By the same token bimetal 42 will be heated slowly when heater 44 is energized. Therefore the frequency of thermostatic demand for heat or the duration of the demand for heat is used as a measure of the heating load or requirement and when this load is great the fire will be cycled between high and intermediate without going to the "off" position at any time. This insures a steady constant flow of heat to the space, prevents the condition known as "cold 70," and avoids the need for repeated energization of the igniter. It will be appreciated that when the valve operator is unlatched for movement to the valve closed position the interlock switch acts to prevent premature re-cycling as described above. Further details of the latching operation and the attendant advantages are shown and described in co-pending application Serial No. 143,251, now Patent No. 2,643,061, which illustrates such mechanism in conjunction with a pot type burner not provided with electric ignition but having the usual pilot flow condition.

The time switch is provided with a heater 71 connected in series with igniter 11 to heat brass bar 72 which radiates heat to trip-out bimetal 73. In the event that ignition does not take place within a predetermined time, bimetal 73 will warp and permit contacts 76 and 75 to separate, breaking the circuit through the igniter and preventing injury thereto. Compensating bimetal 78 compensates for variations in ambient temperature to maintain the trip-out time constant.

If at any time during the operation of this control the bonnet temperature of the furnace should exceed a predetermined maximum, diaphragm 91 will throw to the right (Fig. 8) to move diaphragm pad 90 against adjustable pad 89 in toggle plate 83 to throw the plate overcenter against normally rockable trip lever 28 and force the lever against pin 20 to close outlet valve 19. This limit control must be manually reset before further operation may take place. Since the limit control holds the outlet valve closed, it will be appreciated that unless the control is reset before the time switch breaks the igniter circuit (which would necessarily operate due to lack of fuel for ignition) the timer switch would also require resetting before the control could be placed back in operation.

It should be pointed out that plunger 26 need not necessarily operate on inlet valve 13 but need only operate on interlock lever 24 to act as an override control preventing outlet valve response to movement of operator 27 until such time as the igniter is conditioned for flow of oil to the burner. The positive shut-off of the inlet valve obtained by having plunger 26 operate on the valve as well as the interlock lever can be omitted when desired. While it is preferred that the control stop all flow of fuel to the burner during the "off" portion of the cycle (excepting, of course, when at the intermediate stage) to prevent sooting the burner, the control can be designed for maintenance of a pilot flow in the burner for a limited period of time following movement of the valve operator to what would be the closed position as described above. In such a case the pilot flow could be that amount of oil remaining in control 12 at the termination of the cycle and the interlock lever would be omitted. While providing pilot flow for a period of time in this manner would sometimes avoid energizing the igniter on the "up" cycle, this operation has not been found as satisfactory as that described above.

It will be obvious that other modifications will occur to those skilled in the art. It will be seen that bulb 57 and bellows 53 have a three-fold function of operating the interlock switch operating the igniter switch and regulating fuel flow to the burner on the "up" cycle. Where desired, three separate heat motors could be used in lieu of the single motor shown. Similarly, other types of heat motors may be used instead of bimetals, and other apparatus may be employed to obtain the timed latch feature described with respect to the upper bimetal and its associated apparatus. The fan switch can be omitted where the burner construction will permit such omission. The various safety devices may take other forms and shapes, but the present overriding type of limit control is preferred for obvious reasons. If desired, the upper interlock switch contact need not touch the middle contact when lever 105 allows it to move downwardly. In such a case the thermostat circuit would be broken momentarily as the middle contact moves from the lower to the upper contact, when the bellows expands initially. The brief interruption thus occasioned is not objectionable.

With the above description and remarks it will be appreciated that this invention is to be limited only by the scope of the claims.

We claim:

1. A fuel flow and ignition control comprising, a fuel supply means adapted for connection to a burner and having an outlet valve for regulating flow to the burner, an igniter adapted for placement in a burner, a circuit including a switch for controlling energization of the igniter, electrically energized means adapted to be energized when a thermostat demands heat, said electrically energized means being connected to and operable when energized to close said switch, means including heat responsive means and operable to open said valve in response to a predetermined temperature of said igniter, said heat responsive means being connected to and operable to open said switch in response to the heat of combustion in the burner, said electrically energized means being connected to and operable to move said valve toward its closed position upon satisfaction of the thermostatic demand for heat.

2. A fuel flow and ignition control comprising, a fuel supply means having an outlet adapted for connection to a burner and an outlet valve for regulating flow from the supply, an igniter adapted to ignite fuel entering the burner, a circuit including a switch controlling current flow to the igniter, a circuit including a thermostat and an electrically operable heat motor energized when the thermostat demands heat, said heat motor being connected to and operable to close said switch when energized, means including heat responsive means and operable to open said valve when said igniter reaches ignition temperature, said heat responsive means also being connected to and operative to open said switch when the fuel is ignited, and said heat motor being connected to and operative to close said valve when the thermostat is satisfied.

3. A control according to claim 2 including means operated by said heat responsive means to prevent reclosure of said switch until the temperature of the heat responsive means is below the ignition temperature of the igniter to insure adequate time for the igniter to heat.

4. Control apparatus for an oil burner comprising, a valve for controlling fuel flow to the burner, an electric igniter adapted to be positioned in the burner to ignite incoming fuel, a circuit including said igniter and a switch for controlling energization of the igniter, electrically energized heat motor means connected to said valve and said switch and operative to move in the valve opening direction and to close said switch when energized, means including means responsive to the heat in the burner to retain said valve closed until said igniter reaches ignition temperature and to thereupon open said valve, said heat responsive means being connected to and operative to open said switch upon further heating of said heat responsive means after ignition has taken place in the burner.

5. Apparatus according to claim 4 including means operatively associated with said means responsive to the heat in the burner and operatively connected to said heat motor means to prevent operation thereof when the valve is closed and the temperature in the burner exceeds a predetermined maximum.

6. Control apparatus for oil burners comprising, a fuel supply, a valve for regulating flow from the supply to a burner, first and second valve operating means, each of said means being operable to close said valve and both normally acting to close the valve, an electric igniter adapted to be positioned in a burner, a switch for controlling energization of said igniter, the first